(12) United States Patent
Wei

(10) Patent No.: US 10,686,968 B1
(45) Date of Patent: Jun. 16, 2020

(54) MOTION DETECTION METHOD AND CIRCUIT THEREOF

(71) Applicant: Augentix Inc., Hsinchu (TW)

(72) Inventor: Ku-Chu Wei, New Taipei (TW)

(73) Assignee: Augentix Inc., Hsinchu (TW)

( * ) Notice: Subject to any disclaimer, the term of this patent is extended or adjusted under 35 U.S.C. 154(b) by 0 days.

(21) Appl. No.: 16/445,202

(22) Filed: Jun. 18, 2019

(30) Foreign Application Priority Data

Feb. 27, 2019 (CN) .......................... 2019 1 0146121

(51) Int. Cl.
  *H04N 5/14* (2006.01)
  *G06T 7/20* (2017.01)
  *H04N 5/232* (2006.01)

(52) U.S. Cl.
  CPC ............... *H04N 5/144* (2013.01); *G06T 7/20* (2013.01); *H04N 5/232411* (2018.08)

(58) Field of Classification Search
  CPC ............. H04N 5/144; H04N 5/232411; H04N 21/4436; H04N 5/23241; G06T 7/20
  See application file for complete search history.

(56) References Cited

U.S. PATENT DOCUMENTS

| | | | |
|---|---|---|---|
| 6,658,059 B1 * | 12/2003 | Iu ........................... | H04N 19/51 348/699 |
| 8,089,515 B2 * | 1/2012 | Chebil ................... | G03B 13/36 348/169 |
| 9,749,528 B1 * | 8/2017 | Fink ..................... | H04N 5/23241 |
| 9,860,517 B1 * | 1/2018 | Ramaswamy ..... | H04N 5/23241 |
| 10,021,396 B1 * | 7/2018 | Linzer .................. | H04N 19/105 |
| 2005/0110907 A1 * | 5/2005 | Jung ....................... | H04N 17/00 348/701 |
| 2005/0128292 A1 * | 6/2005 | Miyamaki ............. | G01S 3/7864 348/143 |
| 2005/0179789 A1 * | 8/2005 | Horie ..................... | H04N 9/735 348/223.1 |

(Continued)

FOREIGN PATENT DOCUMENTS

| | | |
|---|---|---|
| TW | 200823802 | 6/2008 |
| TW | 201001336 | 1/2010 |

(Continued)

*Primary Examiner* — Chiawei Chen
(74) *Attorney, Agent, or Firm* — Winston Hsu

(57) ABSTRACT

A motion detection method includes an extracting circuit generating a first representative data according to a first image in an image signal outputted by an image sensor, a buffering circuit storing the first representative data, the extracting circuit generating a second representative data according to a second image in the image signal, the buffering circuit storing the second representative data and outputting the first representative data to a comparing circuit, and the comparing circuit comparing the first representative data and the second representative data, to generate a motion detection result. When the motion detection result represents "motion", an image-signal-processing circuit of an image signal processor enters active state to generate output signal. By means of the motion detection method, in an imaging device, the image-signal-processing circuit of the image signal processor can switch between active state and power-off/power-saving state even when there is no additional infrared sensor.

21 Claims, 10 Drawing Sheets

(56) References Cited

U.S. PATENT DOCUMENTS

| | | | | |
|---|---|---|---|---|
| 2006/0209957 A1* | 9/2006 | Riemens | H04N 7/0115 | 375/240.16 |
| 2007/0140529 A1* | 6/2007 | Iwabuchi | G06T 7/231 | 382/107 |
| 2007/0196083 A1* | 8/2007 | Yamamoto | G03B 17/00 | 396/48 |
| 2008/0252730 A1* | 10/2008 | Hong | G08B 13/19 | 348/155 |
| 2008/0259189 A1* | 10/2008 | Maeda | H04N 5/3595 | 348/248 |
| 2009/0135057 A1* | 5/2009 | Vollath | G01S 19/32 | 342/357.27 |
| 2010/0290532 A1* | 11/2010 | Yamamoto | H04N 19/176 | 375/240.16 |
| 2010/0302397 A1* | 12/2010 | Huang | H04N 5/144 | 348/222.1 |
| 2011/0158518 A1* | 6/2011 | Kang | G06K 9/4642 | 382/165 |
| 2013/0217979 A1* | 8/2013 | Blackadar | A61B 5/0024 | 600/301 |
| 2015/0277401 A1* | 10/2015 | Hsiao | G05B 15/02 | 700/40 |
| 2015/0312488 A1* | 10/2015 | Kostrzewa | H04N 5/2253 | 348/164 |
| 2016/0080652 A1* | 3/2016 | Shirota | H04N 7/183 | 348/222.1 |
| 2016/0227737 A1* | 8/2016 | Dzamba | A01K 5/0225 | |
| 2018/0027077 A1* | 1/2018 | Melodia | H04L 67/12 | 370/254 |
| 2019/0204892 A1* | 7/2019 | Wu | G06F 1/3228 | |
| 2019/0206207 A1* | 7/2019 | Mysell | G08B 13/19 | |

FOREIGN PATENT DOCUMENTS

| | | |
|---|---|---|
| TW | 201205363 A1 | 2/2012 |
| TW | 201306586 A1 | 2/2013 |
| TW | 201432218 A | 8/2014 |

* cited by examiner

US 10,686,968 B1

MOTION DETECTION METHOD AND CIRCUIT THEREOF

BACKGROUND OF THE INVENTION

1. Field of the Invention

The present disclosure relates to a motion detection method, and more particularly, to a motion detection method for an image device to detect moving objects without additional infrared motion sensor.

2. Description of the Prior Art

Please refer to FIG. 1. FIG. 1 is a schematic diagram illustrating a conventional image device 100. The image device 100 includes an image signal processor 110, am image sensor 120, and an infrared motion sensor 130. The image sensor 120 receives light to output an image signal $S_{IMG}$. The image signal processor 110 generates an output signal $S_{OUT}$ according to the image signal $S_{IMG}$. The output signal $S_{OUT}$ can be video with H.264/H.265/MJPEG compression format, or photo with JPEG format. The image signal processor 110 can be SoC (System on Chip). The infrared motion sensor 130 detects the change of infrared light to generate a motion detection result $S_{MOV}$. Furthermore, when there is moving object, there is disturbance in the infrared spectrum. Hence, the infrared motion sensor 130 generates the motion detection result $S_{MOV}$ representing "motion", to let the image signal processor 110 enter active state. When the image signal processor 110 is in active state, the image signal processor 110 generates the output signal $S_{OUT}$ according to the image signal $S_{IMG}$. When there is no moving object in the detection range of the infrared motion sensor 130, the motion detection result $S_{MOV}$ represents "motionless". At the time, the image signal processor 110 stays in power-off/power-saving state, saving the power consumption.

However, since the image device 100 needs to have the infrared motion sensor 130 to detect moving objects, the cost and the size of the image device 100 are increased. In addition, the detection range of the infrared motion sensor 130 is different from the field of view (FOV) of the image sensor 120. Hence, even when the image signal processor 110 enters active state because of the infrared motion sensor 130 finding moving object, it still may happen that there is no moving object in the video or photo in the output signal $S_{OUT}$ generated by image signal processor 110.

SUMMARY OF THE INVENTION

It is therefore an objective to provide a motion detection method to solve the above problems.

The present disclosure provides a motion detection method comprises an extracting circuit generating a first representative data according to a first image in a first image signal outputted by a first image sensor, a buffering circuit storing the first representative data, the extracting circuit generating a second representative data according to a second image in the first image signal, the buffering circuit storing the second representative data and outputting the first representative data to a comparing circuit, and the comparing circuit comparing the first and the second representative data to generate a motion detection result.

The present disclosure provides a motion detection circuit. The motion detection circuit comprises an extracting circuit, a buffering circuit, and a comparing circuit. The extracting circuit is coupled to an image sensor. The image sensor receives light to output an image signal. The extracting circuit generates a first representative data according to a first image in the image signal, and generates a second representative data according to a second image in the image signal. The buffering circuit is coupled to the extracting circuit. The comparing circuit is coupled to the extracting circuit and the buffering circuit. The comparing circuit generates a comparing signal as a motion detection result. When the extracting circuit generates the first representative data, the buffering circuit stores the first representative data. When extracting circuit generates the second representative data, the buffering circuits stores the second representative data and outputs the first representative data to the comparing circuit, and the comparing circuit generates the comparing signal as the motion detection result, according to the first and the second representative data.

The present disclosure provides an image signal processor. The image signal processor comprises a motion detection circuit, and an image-signal-processing circuit. The motion detection circuit comprises an extracting circuit, a buffering circuit, and a comparing circuit. The extracting circuit is coupled to an image sensor. The image sensor receives light to output an image signal. The extracting circuit generates a first representative data according to a first image in the image signal, and generates a second representative data according to a second image in the image signal. The buffering circuit is coupled to the extracting circuit. The comparing circuit is coupled to the extracting circuit and the buffering circuit. The comparing circuit generates a comparing signal as a motion detection result. When the extracting circuit generates the first representative data, the buffering circuit stores the first representative data. When extracting circuit generates the second representative data, the buffering circuits stores the second representative data and outputs the first representative data to the comparing circuit, and the comparing circuit generates the comparing signal as the motion detection result, according to the first and the second representative data. The image-signal-processing circuit generates an output signal. When the image-signal-processing circuit is in power-off/power-saving state and the motion detection result represents "motion", the image-signal-processing circuit enters active state. When the image-signal-processing circuit is in active state, the image-signal-processing circuit generates the output signal according to the image signal.

The present disclosure provides an image device. The image device comprises a first image sensor, and an image signal processor. The first image sensor receives light to generate a first image signal. The image signal processor comprises a first motion detection circuit, and an image-signal-processing circuit. The first motion detection circuit comprises a first extracting circuit, a first buffering circuit, and a first comparing circuit. The first extracting circuit is coupled to the first image sensor. The first extracting circuit generates a first representative data according to a first image in the first image signal, and generates a second representative data according to a second image in the first image signal. The first buffering circuit is coupled to the first extracting circuit. The first comparing circuit is coupled to the first extracting circuit and the first buffering circuit. The first comparing circuit generates a first comparing signal as a motion detection result. When the first extracting circuit generates the first representative data, the first buffering circuit stores the first representative data. When the first extracting circuit generates the second representative data, the first buffering circuits stores the second representative data and outputs the first representative data to the first comparing circuit, and the first comparing circuit compares the first and the second representative data to generate the first comparing signal as the motion detection result. The image-signal-processing circuit generates an output signal. When the image-signal-processing circuit is in power-off/power-saving state and the motion detection result represents "motion", the image-signal-processing circuit enters active state. When the image-signal-processing circuit is in active state, the image-signal-processing circuit generates the output signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
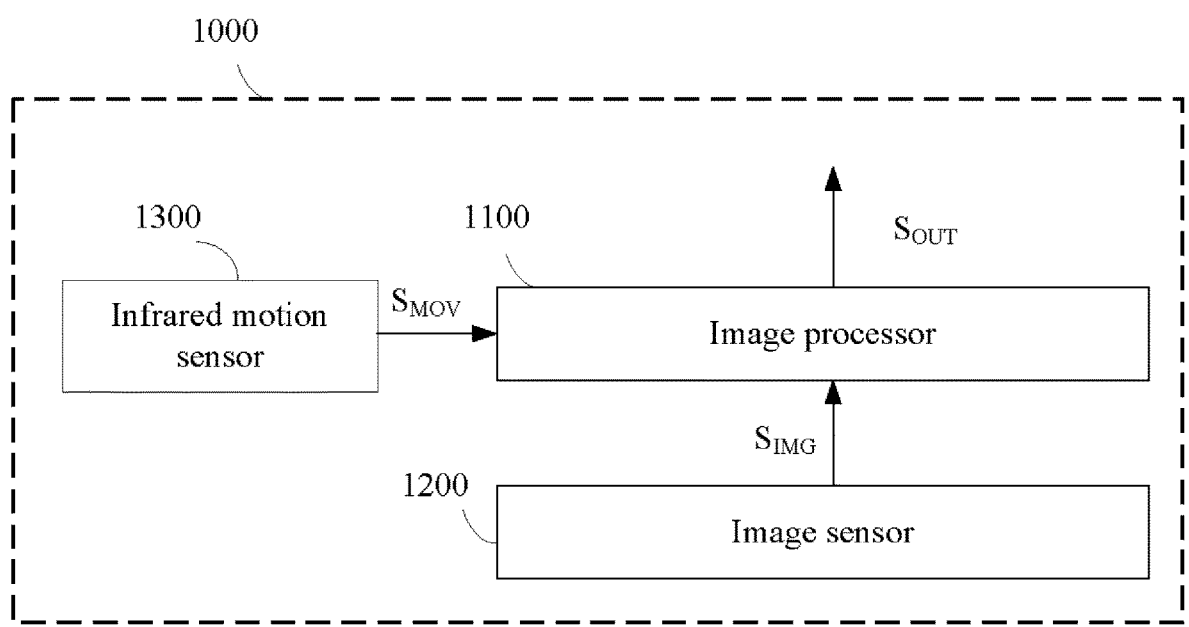
FIG. 1 is a schematic diagram illustrating an image device 100 according to the prior art.
Figure 2:
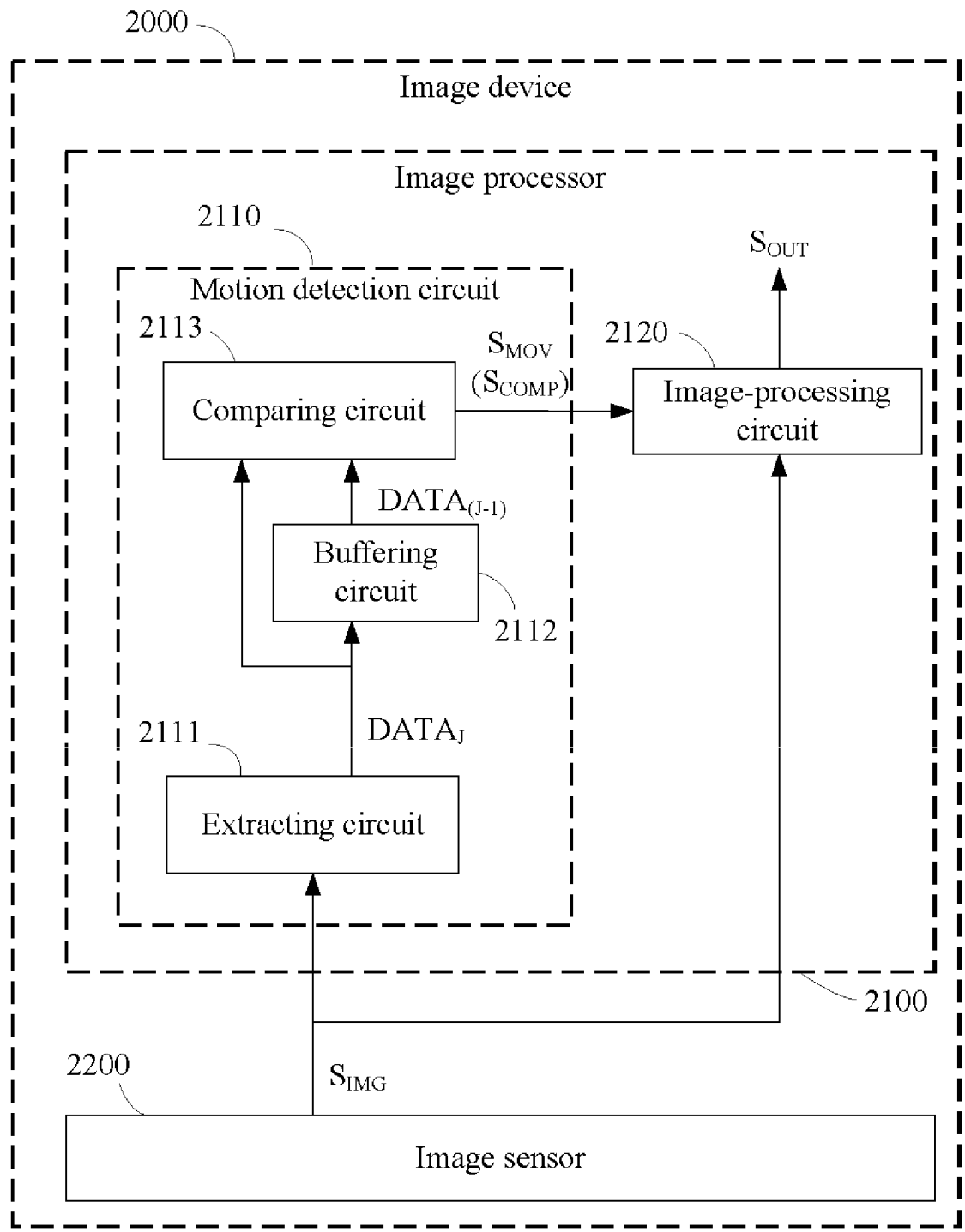
FIG. 2 is a schematic diagram illustrating a motion detection circuit, an image signal processor, and an image device according to an embodiment of the present disclosure.

Please refer to FIG. 2. FIG. 2 is a schematic diagram illustrating an embodiment of a motion detection circuit, an image signal processor, and an image device according to an embodiment of the present disclosure. The image device 2000 includes an image signal processor 2100, and an image sensor 2200. The image sensor 2200 receives light to generate an image signal $S_{IMG}$. The image signal processor 2100 includes a motion detection circuit 2110, and an image-signal-processing circuit 2120. The image signal processor 2100 can be a SoC (System on Chip). When the image-signal-processing circuit 2120 is in active state, the image-signal-processing circuit generates an output signal $S_{OUT}$ according to the image signal $S_{IMG}$. The output signal $S_{OUT}$ can be video with H.264/H.265/MJPEG compression format, or photo with JPEG format, or the image analysis data by analyzing the image data in image signal $S_{IMG}$. The image analysis data, for instance, includes the information of the position, the size, and the speed of the moving objects in the image of image signal $S_{IMG}$. The motion detection circuit 2110 includes an extracting circuit 2111, a buffering circuit 2112, and a comparing circuit 2113. The extracting circuit is coupled to the image sensor 2200. The extracting circuit 2111 generates representative data of image, according to the image in the image signal $S_{IMG}$. The buffering circuit 2112 is coupled to the extracting circuit 2111. When the extracting circuit 2111 generates the representative data of the current image to the buffering circuit 2112, the buffering circuit 2112 outputs the representative data of the previous image to the comparing circuit 2113, and stores the representative data of the current image. The comparing circuit 2113 is coupled to the extracting circuit 2111 and the buffering circuit 2112. The comparing circuit 2113 generates a motion detection result $S_{MOV}$. More particularly, the comparing circuit 2113 compares the representative data of the previous image and the current image, to generate a comparing signal $S_{COMP}$ as the motion detection result $S_{MOV}$. When the image-signal-processing circuit 2120 is in power-off/power-saving state and the motion detection result $S_{MOV}$ represents "motion", the image-signal-processing circuit 2120 enters active state. When the motion detection result $S_{MOV}$ represents "motionless", the image-signal-processing circuit 2120 stays in power-off/power-saving state. In this way, even there is no additional infrared motion sensor, the image device 2000 still can detect moving objects by the motion detection circuit 2110 and the image sensor 2200, so as to determine the image-signal-processing circuit 2120 to enter active state or stay in power-off/power-saving state. Hence, the cost and the size of the image device 2000 are reduced. In addition, the detection range of the motion detection circuit 2110 is the same as the field of view of the image sensor 2200. Therefore, when the motion detection circuit 2110 detects moving object and triggers the image-signal-processing circuit 2120 to enter active state, the image in the output signal $S_{OUT}$ generated by the image-signal-processing circuit 2120 includes the moving objects, or the image analysis data of the output signal $S_{OUT}$ includes the information of moving objects, providing more convenience to the user.

Figure 3:
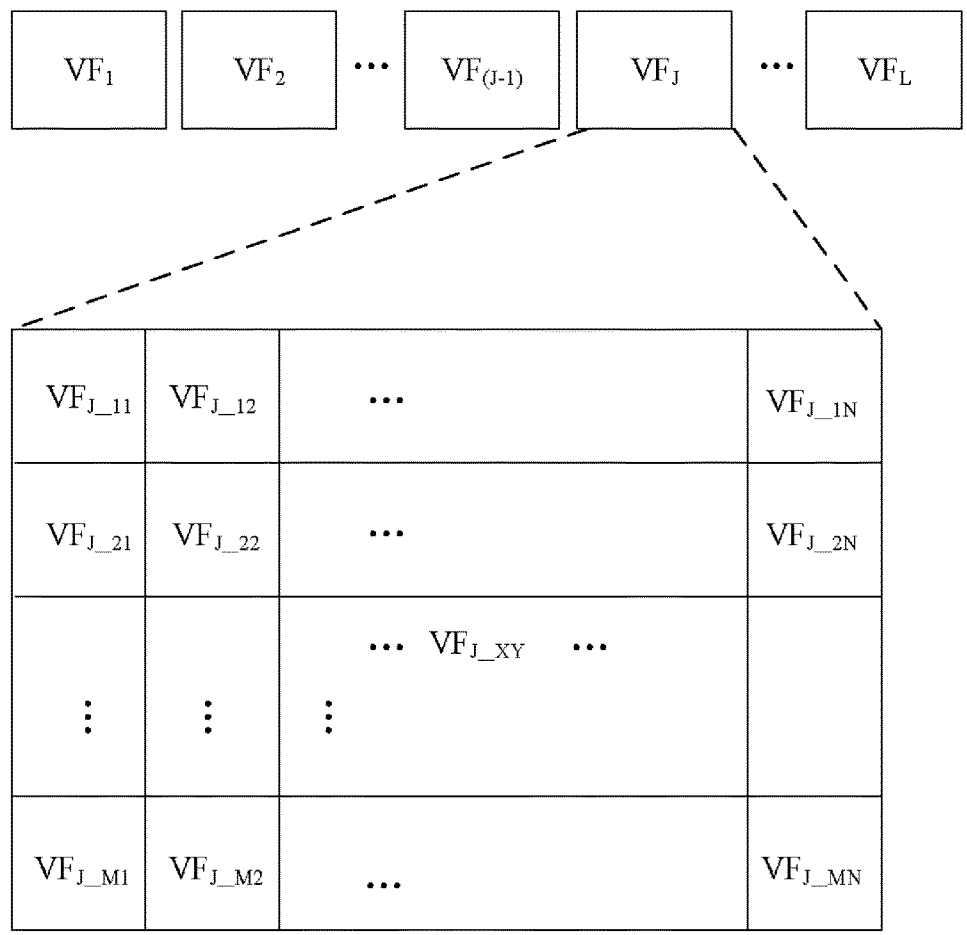
FIG. 3 and FIG. 4 are diagrams illustrating the operational principle of the motion detection circuit of the present disclosure.
Figure 4:
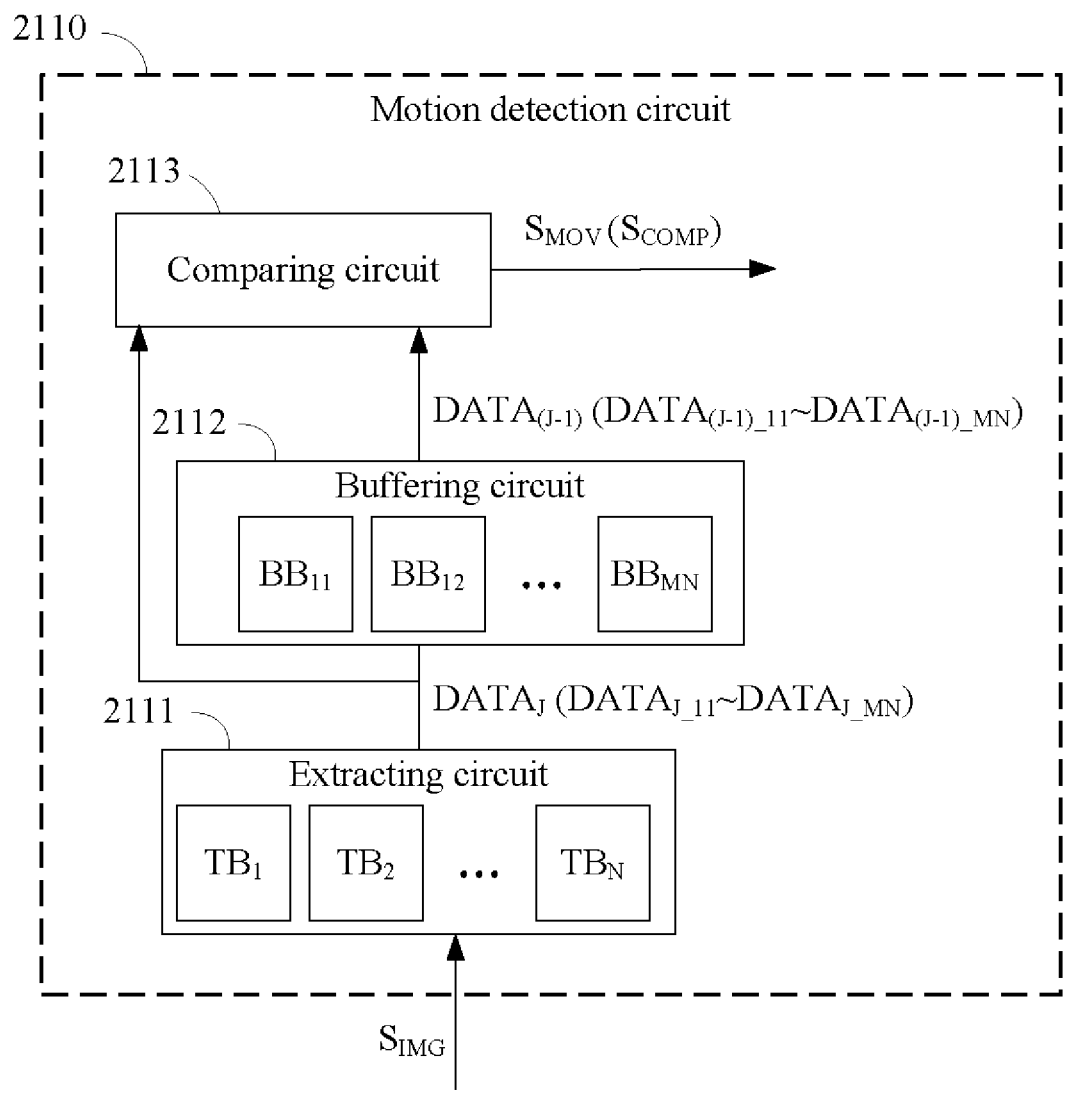

Please refer to FIG. 3 and FIG. 4. FIG. 3 and FIG. 4 are diagrams illustrating the operational principle of motion detection circuit 2110. The image sensor 2200 transmits images $VF_1, VF_2, \ldots VF_{(J-1)}, VF_J, \ldots VF_L$ via image signal $S_{IMG}$, wherein J and L are positive integers and J≤L. As shown in FIG. 3, the image sensor 2200 includes sub-sensing regions $R_{11}$~$R_{MN}$. Each image $VF_1$~$VF_L$ includes sub-region images corresponding to the sub-sensing regions $R_{11}$~$R_{MN}$ of the image sensor 2200. X, Y, M, N in FIG. 3 and FIG. 4 are all positive integers, and X≤M, and Y≤N. The image $VF_1$ includes the sub-region images $VF_{1\_11}$~$VF_{1\_MN}$. The image $VF_2$ includes the sub-region images $VF_{2\_11}$~$VF_{2\_MN}$. The image $VF_J$ includes the sub-region images $VF_{J\_11}$~$VF_{J\_MN}$. The rest may be deduced by analogy.

In FIG. 4, the extracting circuit 2111 includes N temporary storage units $TB_1$~$TB_N$. The extracting circuit 2111 generates representative data $DATA_1$~$DATA_L$ corresponding to the images $VF_1$~$VF_L$, based on the images $VF_1$~$VF_L$ in the image signal $S_{IMG}$. Each representative data $DATA_1$~$DATA_L$ includes sub-region representative data corresponding to the sub-sensing regions $R_{11}$~$R_{MN}$. The representative data $DATA_J$ includes sub-region representative data $DATA_{J\_11}$~$DATA_{J\_MN}$ corresponding to the sub-sensing regions $R_{11}$~$R_{MN}$. The temporary storage units $TB_1$~$TB_N$ are utilized for temporarily storing the sub-region representative data generated by the extracting circuit 2111. Take the image $VF_J$ as an example. The image sensor 2200 outputs the pixel data, row by row, from the top left pixel to the bottom right pixel of the image $VF_J$. That is, during the periods that the image sensor 2200 outputs the image $VF_J$ via image signal $S_{IMG}$, the image sensor 2200 first outputs the sub-region images $VF_{J\_11}$~$VF_{J\_1N}$, and then sub-region images $VF_{J\_21}$~$VF_{J\_2N}$, and so on. Finally, the image sensor 2200 outputs the sub-region images $VF_{J\_M1}$~$VF_{J\_MN}$. During the period that the image sensor 2200 outputs the sub-region images $VF_{J\_11}$~$VF_{J\_1N}$, the extracting circuit 2111 generates the sub-region representative data $DATA_{J\_11}$ corresponding to the sub-region image $VF_{J\_11}$, according to the data of a plurality of pixels in the sub-region image VF 11. The sub-region representative data $DATA_{J\_11}$ can be the average value, histogram, or maximum and minimum values of the data of the plurality of pixels in the sub-region image $VF_{J\_11}$. More particularly, every time when the extracting circuit 2111 receives data of a pixel in sub-region image $VF_{J\_11}$, the extracting circuit 2111 updates the in-progress sub-region representative data $DATA_{J\_11\_TEMP}$, according to the in-progress sub-region representative data $DATA_{J\_11\_TEMP}$ previously stored in the temporary storage unit $TB_1$ and the received data of the pixel. The extracting circuits 2111 stores the updated in-progress sub-region representative data $DATA_{J\_11\_TEMP}$ in the temporary storage unit $TB_1$. When the image sensor 2200 is finished with transmitting the data of pixels in sub-region image $VF_{J\_11}$, the extracting circuit 2111 generates the final sub-region representative data $DATA_{J\_11}$. Moreover, when the image sensor 2200 is finished with transmitting the data of pixels in sub-region image $VF_{J\_11}$, the extracting circuit 2111 outputs the sub-region representative data $DATA_{J\_11\_TEMP}$ stored in temporary storage unit $TB_1$, as the final sub-region representative data $DATA_{J\_11}$, to the buffering circuit 2112 and the comparing circuit 2113. Similarly, when the extracting circuit 2111 receives data of pixels in sub-region images $VF_{J\_12}$~$VF_{J\_1N}$, the extracting circuit 2111 generates the updated in-progress sub-region representative data $DATA_{J\_12\_TEMP}$~$DATA_{J\_1N\_TEMP}$, based on the previous in-progress sub-region representative data $DATA_{J\_12\_TEMP}$~$DATA_{J\_1N\_TEMP}$ stored in temporary storage units $TB_2$~$TB_N$, and the received data of the pixels. When the image sensor 2200 is finished with transmitting the data of the pixels in sub-region images $VF_{J\_12}$~$VF_{J\_1N}$, the extracting circuit 2111 outputs the sub-region representative data $DATA_{J\_12\_TEMP}$~$DATA_{J\_1N\_TEMP}$ respectively stored in temporary storage units $TB_2$~$TB_N$, as the final sub-region representative data $DATA_{J\_12}$~$DATA_{J\_1N}$, to the buffering circuit 2112 and the comparing circuit 2113.

Similarly, during the periods that the image sensor 2200 outputs the sub-region images $VF_{J\_21}$~$VF_{J\_2N}$, the extracting circuit 2111 generates the sub-region representative data $DATA_{J\_21}$~$DATA_{J\_2N}$, according to data of a plurality of pixels in the sub-region image $VF_{J\_21}$~$VF_{J\_2N}$, and outputs the sub-region representative data $DATA_{J\_21}$~$DATA_{J\_2N}$ to the buffering circuit 2112 and the comparing circuit 2113.

In FIG. 3, $VF_{J\_XY}$ is the Xth row and the Yth column sub-region image of the image $VF_J$. The sub-region image $VF_{J\_XY}$ corresponds to the sub-sensing region $R_{XY}$. X and Y are positive integers, and $1 \leq X \leq M$, and $1 \leq Y \leq N$. When the extracting circuit 2111 receives data of a pixel in sub-region image $VF_{J\_XY}$, the extracting circuit 2111 updates the in-progress sub-region representative data $DATA_{J\_XY\_TEMP}$, according to the in-progress sub-region representative data $DATA_{J\_XY\_TEMP}$ previously stored in the temporary storage unit $TB_Y$ and the received data of the pixel, and the extracting circuits 2111 stores the updated in-progress sub-region representative data $DATA_{J\_XY\_TEMP}$ into the temporary storage unit $TB_Y$. When the image sensor 2200 is finished with transmitting the data of pixels in sub-region image $VF_{J\_XY}$, the extracting circuit 2111 generates the final sub-region representative data $DATA_{J\_XY}$. Moreover, when the image sensor 2200 is finished with transmitting the data of the pixels in sub-region image $VF_{J\_XY}$, the extracting circuit 2111 outputs the sub-region representative data $DATA_{J\_XY\_TEMP}$ stored in the temporary storage unit $TB_Y$, as the final sub-region representative data $DATA_{J\_XY}$, to the buffering circuit 2112 and the comparing circuit 2113.

The present disclosure provides another embodiment of the extracting circuit 2111. The extracting circuit 2111 outputs the sub-region representative data $DATA_{J\_XY}$ according to data of pixels which includes at least a plurality of pixels in the sub-region image $VF_{J\_XY}$. The extracting circuit 2111 generates the sub-region representative data $DATA_{J\_XY}$ according to the data of the plurality of pixels in sub-region images $VF_{J\_X(Y-1)}$, $VF_{J\_XY}$, and $VF_{J\_X(Y+1)}$. When Y is equal to 1, the data of the pixels in sub-region image $VF_{J\_X(Y-1)}$ is replaced by the data of the pixels in sub-region image $VF_{J\_XY}$. When Y is equal to N, the data of the pixels in sub-region image $VF_{J\_X(Y+1)}$ is replaced by the data of the pixels in sub-region image $VF_{J\_XY}$. The sub-region representative data $DATA_{J\_XY}$ can be the weighted average value of the data of the plurality of pixels in sub-region images $VF_{J\_X(Y-1)}$~$VF_{J\_X(Y+1)}$, where the data of pixels in sub-region image $VF_{J\_XY}$ has more weight than those in sub-region images $VF_{J\_X(Y-1)}$ and $VF_{J\_X(Y+1)}$ According to other embodiments of the present disclosure, the sub-region representative data $DATA_{J\_XY}$ can be the histogram of sub-region images $VF_{J\_X(Y-1)}$~$VF_{J\_X(Y+1)}$, or the maximum and minimum values of the data of the plurality of pixels in sub-region images $VF_{J\_X(Y-1)}$~$VF_{J\_X(Y+1)}$. When the extracting circuit 2111 receives the data of the pixels in sub-region images $VF_{J\_X(Y-1)}$~$VF_{J\_X(Y+1)}$, the extracting circuit 2111 updates the in-progress sub-region representative data $DATA_{J\_XY\_TEMP}$ according to the in-progress sub-region representative data $DATA_{J\_XY\_TEMP}$ previously stored in temporary storage unit $TB_Y$, and stores the updated in-progress sub-region representative data $DATA_{J\_XY\_TEMP}$ into the temporary storage unit $TB_Y$. When the image sensor 2200 is finished with transmitting the data of the pixels in sub-region images $VF_{J\_X(Y-1)}$~$VF_{J\_X(Y+1)}$, the extracting circuit 2111 generates the sub-region representative data $DATA_{J\_XY}$. More particularly, when the image sensor 2200 is finished with transmitting the data of the pixels in sub-region images $VF_{J\_X(Y-1)}$~$VF_{J\_X(Y+1)}$, the extracting circuit 2111 outputs the in-progress sub-region representative data $DATA_{J\_XY\_TEMP}$ stored in temporary storage unit $TB_Y$, as the final sub-region representative data $DATA_{J\_XY}$, to the buffering circuit 2112 and the comparing circuit 2113.

The buffering circuit 2112 includes buffering units $BB_{11}$~$BB_{MN}$. When the extracting circuit 2111 generates the sub-region representative data $DATA_{J\_11}$, the buffering circuit 2112 outputs the sub-region representative data $DATA_{(J-1)\_11}$ corresponding to the previous image $VF_{(J-1)}$, stored in the buffering unit $BB_{11}$, to the comparing circuit 2113. Meanwhile, the buffering circuit 2112 stores the sub-region representative data $DATA_{J\_11}$ corresponding to the current image $VF_J$ into the buffering unit $BB_{11}$. The comparing circuit 2113 compares the sub-region representative data $DATA_J$ generated by the extracting circuit 2111 and the sub-region representative data $DATA_{(J-1)\_11}$ outputted by the buffering circuit 2112, to generate the comparing signal $S_{COMP}$ as the motion detection result $S_{MOV}$. Similarly, when the extracting circuit 2111 outputs the sub-region representative data $DATA_{J\_12}$, the buffering circuit 2112 outputs the sub-region representative data $DATA_{(J-1)\_12}$, stored in the buffering unit $BB_{12}$, to the comparing circuit 2113. Meanwhile, the buffering circuit 2112 stores the sub-region representative data $DATA_{J\_12}$ into the buffering unit $BB_{12}$. The comparing circuit 2113 compares the sub-region representative data $DATA_{J\_12}$ generated by the extracting circuit 2111 and the sub-region representative data $DATA_{(J-1)\_12}$ outputted by the buffering circuit 2112, to generate the comparing signal $S_{COMP}$ as the motion detection result $S_{MOV}$. The rest may be deduced in analogy.

In addition, when the buffering circuit 2112 receives the sub-region representative data $DATA_{J\_11}$~$DATA_{J\_MN}$ of the current image $VF_J$ generated by the extracting circuit 2111, the buffering circuit 2112 outputs the sub-region representative data $DATA_{(J-1)\_11}$~$DATA_{(J-1)\_MN}$ of the previous image $VF_{(J-1)}$, which are stored in the buffering units $BB_{11}$~$BB_{MN}$, to the comparing circuit 2113. Meanwhile, the buffering circuit 2112 stores the sub-region representative data $DATA_{J\_11}$~$DATA_{J\_MN}$ of the current image $VF_J$ into the buffering units $BB_{11}$~$BB_{MN}$. As a result, the number of the buffering units in buffer circuit 2112 can be reduced to the number of buffering units necessary for storing sub-region representative data of one image. In this way, the cost and the power consumption of motion detection circuit 2110 are reduced.

The comparing circuit 2113 generates the comparing signal $S_{COMP}$ as the motion detection result $S_{MOV}$, according to the sub-region representative data $DATA_{J\_XY}$ and $DATA_{(J-1)\_XY}$. More particularly, when the difference between the sub-region representative data $DATA_{J\_XY}$ and $DATA_{(J-1)\_XY}$ is large, comparing circuit 2113 determines that there is moving object in the field of view corresponding to the sub-sensing region $R_{XY}$. Consequently, the comparing circuit 2113 generates the comparing signal $S_{COMP}$ as the motion detection result $S_{MOV}$ representing "motion". When the difference between the sub-region representative data $DATA_{J\_XY}$ and $DATA_{(J-1)\_XY}$ is little, comparing circuit 2113 determines that there is no moving object in the field of view corresponding to the sub-sensing region $R_{XY}$. Consequently, the comparing circuit 2113 generates the comparing signal $S_{COMP}$ as the motion detection result $S_{MOV}$ representing "motionless". Furthermore, the comparing circuit 2113 generates the comparing signal $S_{COMP}$ as the motion detection result $S_{MOV}$, by comparing a threshold and the difference between the sub-region representative data $DATA_{J\_XY}$ of the current image $VF_J$ and the sub-region representative data $DATA_{(J-1)\_XY}$ of the previous image $VF_{(J-1)}$. When the sub-region representative data $DATA_{J\_XY}$ and $DATA_{(J-1)\_XY}$ are average values of the data of the plurality of pixels in sub-region images $VF_{J\_XY}$ and $VF_{(J-1)\_XY}$, the difference between the sub-region representative data $DATA_{J\_XY}$ and $DATA_{(J-1)\_XY}$ can be the absolute difference of sub-region representative data $DATA_{J\_XY}$ and $DATA_{(J-1)\_XY}$. When the sub-region representative data $DATA_{J\_XY}$ and $DATA_{(J-1)\_XY}$ are maximum and minimum values of the data of the plurality of pixels in sub-region images $VF_{J\_XY}$ and $VF_{(J-1)\_XY}$, the difference between the sub-region representative data $DATA_{J\_XY}$ and $DATA_{(J-1)\_XY}$ can be the weighted average of the absolute difference of the maximum values and the absolute difference of the minimum values corresponding to the sub-region images $VF_{J\_XY}$ and $VF_{(J-1)\_XY}$. When the sub-region representative data $DATA_{J\_XY}$ and $DATA_{(J-1)\_XY}$ are histogram of the data of the plurality of pixels in sub-region images $VF_{J\_XY}$ and $VF_{(J-1)\_XY}$, the difference between the sub-region representative data $DATA_{J\_XY}$ and $DATA_{(J-1)\_XY}$ can be the sum of the difference of the number of pixels of sub-region images $VF_{J\_XY}$ and $VF_{(J-1)\_XY}$ at each brightness level. In this way, when the difference between the sub-region representative data $DATA_{J\_XY}$ and $DATA_{(J-1)\_XY}$ is larger or equal to the threshold, the comparing signal $S_{COMP}$ generated by the comparing circuit 2113 can be the motion detection result $S_{MOV}$ representing "motion". When the difference between the sub-region representative data $DATA_{J\_XY}$ and $DATA_{(J-1)\_XY}$ is less than the threshold, the comparing signal $S_{COMP}$ generated by the comparing circuit 2113 can be the motion detection result $S_{MOV}$ representing "motionless"

In summary, in the image device 2000, the image sensor 2200 receives light to output image signal $S_{IMG}$. The extracting circuit 2111 generates the representative data of the images according to the images in the image signal $S_{IMG}$. When the buffering circuit 2112 receives representative data of the current image, the buffering circuit 2112 outputs the representative data of the previous image to the comparing circuit 2113, and stores the representative data of the current image. The comparing circuit 2113 generates the comparing signal $S_{COMP}$ as the motion detection result $S_{MOV}$, according to the difference between the representative data of the current image and the previous image. When the image-signal-processing circuit 2120 is in power-off/power-saving state and the motion detection result $S_{MOV}$ represents "motion", the image-signal-processing circuit 2120 enters active state. When the motion detection result $S_{MOV}$ represents "motionless", the image-signal-processing circuit 2120 stays in power-off/power-saving state. In this way, the cost and the size of the image device 2000 are reduced. In addition, when detecting there is moving object and the image-signal-processing circuit 2120 is triggered to enter active state, the image in output signal $S_{OUT}$ generated by the image-signal-processing circuit 2120 has the moving object, and the corresponding image analysis data includes the information of moving objects, providing more convenience to the user.

Figure 5:
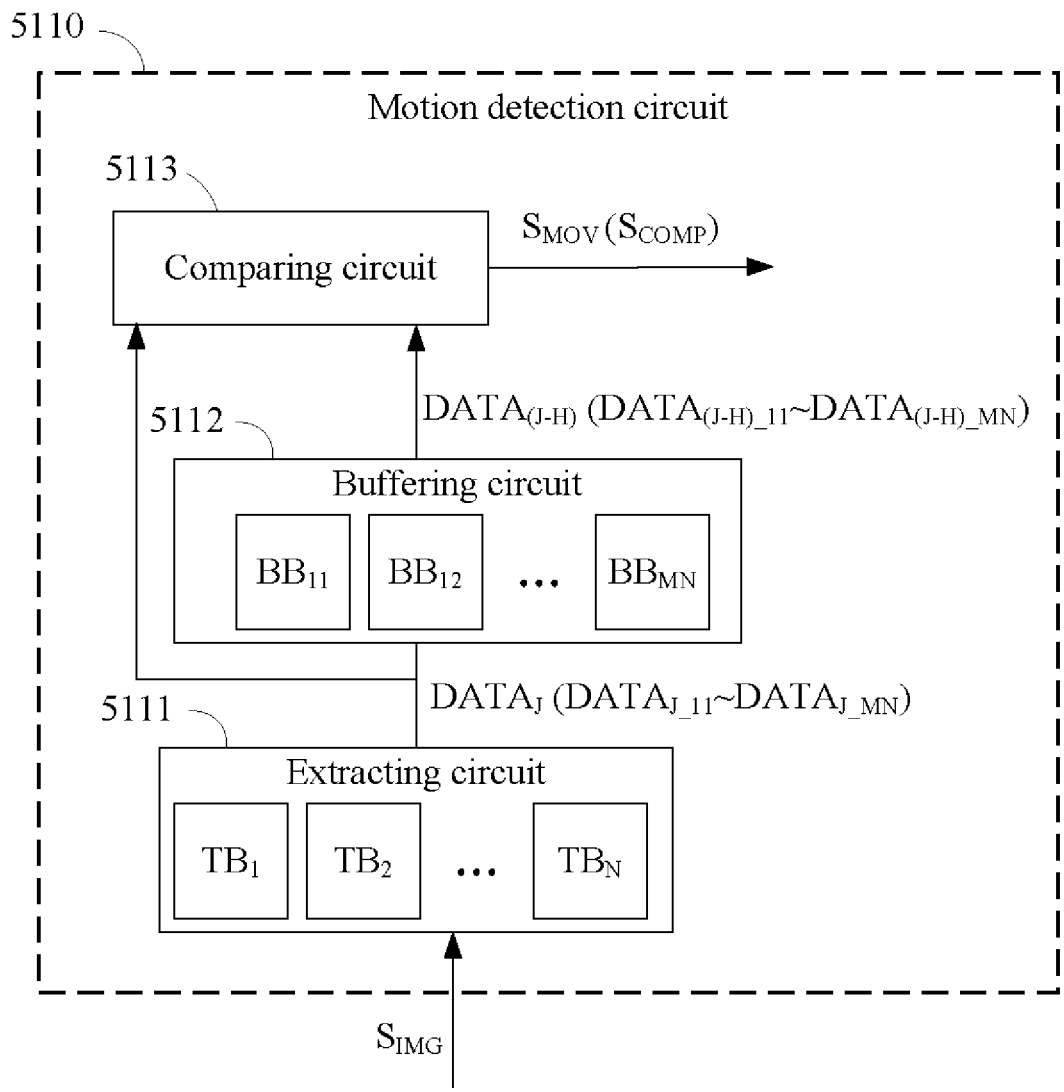
FIG. 5 is a schematic diagram illustrating a motion detection circuit according to another embodiment of the present disclosure.

Please refer to FIG. 5. FIG. 5 is a schematic diagram illustrating a motion detection circuit 5000 according to another embodiment of the present disclosure. The motion detection circuit 5110 includes an extracting circuit 5111, a buffering circuit 5112, and a comparing circuit 5113. The motion detection circuit 5110 operates once every H images, wherein 1≤H. The motion detection circuit 2110 actually is a special case of the motion detection circuit 5110 when H is equal to one. Furthermore, the extracting circuit 5111 generates representative data once every H images. When the extracting circuit 5111 generates the representative data $DATA_J$ ($DATA_{J\_11}$~$DATA_{J\_MN}$) according to the image $VF_J$, the buffering circuit 5112 stores the representative data $DATA_J$($DATA_{J\_11}$~$DATA_{J\_MN}$) and outputs the representative data $DATA_{(J-H)}$ ($DATA_{(J-H)\_11}$~$DATA_{(J-H)\_MN}$) of the image $VF_{(J-H)}$ to the comparing circuit 5113. The comparing circuit 5113 compares the representative data $DATA_J$ and $DATA_{(J-H)}$ to generate comparing signal $S_{COMP}$ as the motion detection result $S_{MOV}$. The operation times of the extracting circuit 5111, the buffering circuit 5112, and the comparing circuit 5113 can be reduced by increasing H, saving more power consumption of the motion detection circuit 5110.

Figure 6:
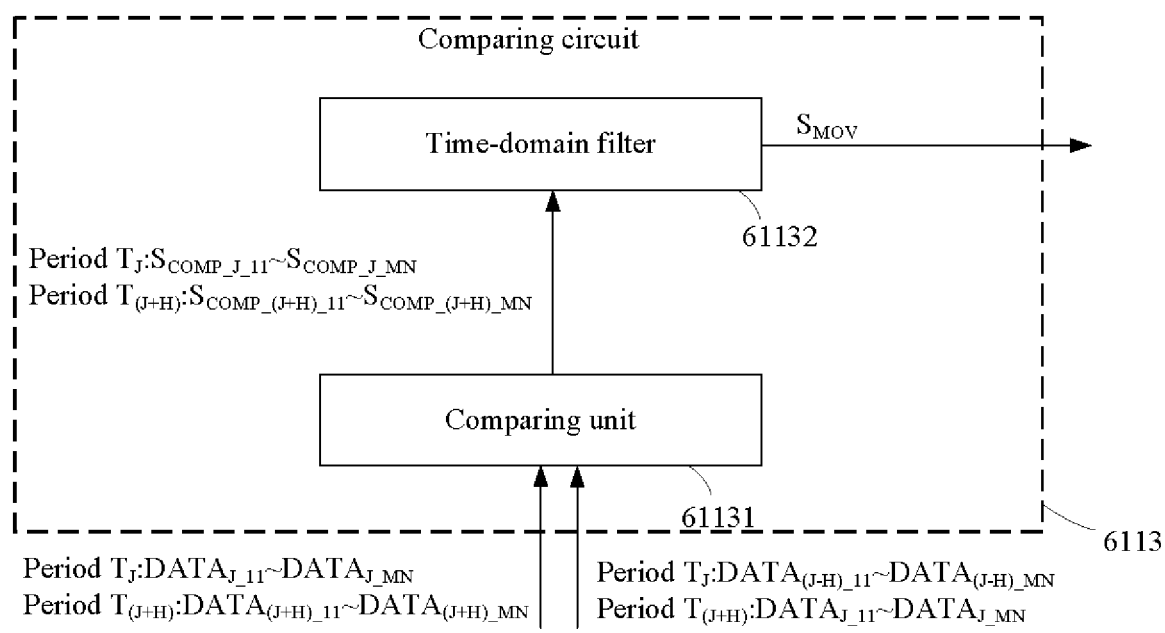
FIG. 6 is a schematic diagram illustrating a comparing circuit according to an embodiment of the present disclosure.

Please refer to FIG. 6. FIG. 6 is a schematic diagram illustrating a comparing circuit 6113 according to an embodiment of the present disclosure. The comparing circuit 6113 includes a comparing unit 61131 and a temporal filter 61132. The comparing unit 61131 compares the representative data generated by the extracting circuit 5111 and the representative data outputted by the buffering circuit 5112 during different periods, so as to generate the comparing signal corresponding to each period, respectively. Take the period $T_J$ as an example. The comparing unit 61131 compares the representative data $DATA_{J\_11}$~$DATA_{J\_MN}$ generated by the extracting circuit 5111 and the representative data $DATA_{(J-H)\_11}$~$DATA_{(J-H)\_MN}$ outputted by the buffering circuit 5512, to generate the comparing signals $S_{COMP\_J\_11}$~$S_{COMP\_J\_MN}$ corresponding to the period $T_J$, wherein 1≤H. The comparing unit 61131 compares the representative data $DATA_{(J+H)\_11}$~$DATA_{(J+H)\_MN}$ generated by the extracting circuit 5111 and the representative data $DATA_{J\_11}$~$DATA_{J\_MN}$ outputted by the buffering circuit 5512, to generate the comparing signals $S_{COMP\_(J+H)\_11}$~$S_{COMP\_(J+H)\_MN}$ corresponding to the period $T_{(J+H)}$. The temporal filter 61132 filters comparing signals of plural periods, to generate the motion detection result $S_{MOV}$. The temporal filter 61132 can be a low-pass filter. For instance, the temporal filter 61132 sums up the comparing signals $S_{COMP\_J\_11}$~$S_{COMP\_J\_MN}$ of the period $T_J$ and the comparing signals $S_{COMP\_(J+H)\_11}$~$S_{COMP\_(J+H)\_MN}$ of the period $T_{(J+H)}$ to obtain an accumulated value, and compares the accumulated value and a threshold to generate the motion detection result $S_{MOV}$. When the accumulated value is larger or equal to the threshold, the motion detection result $S_{MOV}$ represents "motion". When the accumulated value is less than the threshold, the motion detection result $S_{MOV}$ represents "motionless". In addition, the threshold value can be a predetermined value or an adaptive threshold value based on the representative data which are already received, or the past motion detection results. For example, when the motion detection result $S_{MOV}$ generated by temporal filter 61132 represents "motion", the temporal filter 61132 decreases the threshold. When the motion detection result $S_{MOV}$ generated by temporal filter 61132 represents "motionless", the temporal filter 61132 increases the threshold.

Figure 7:
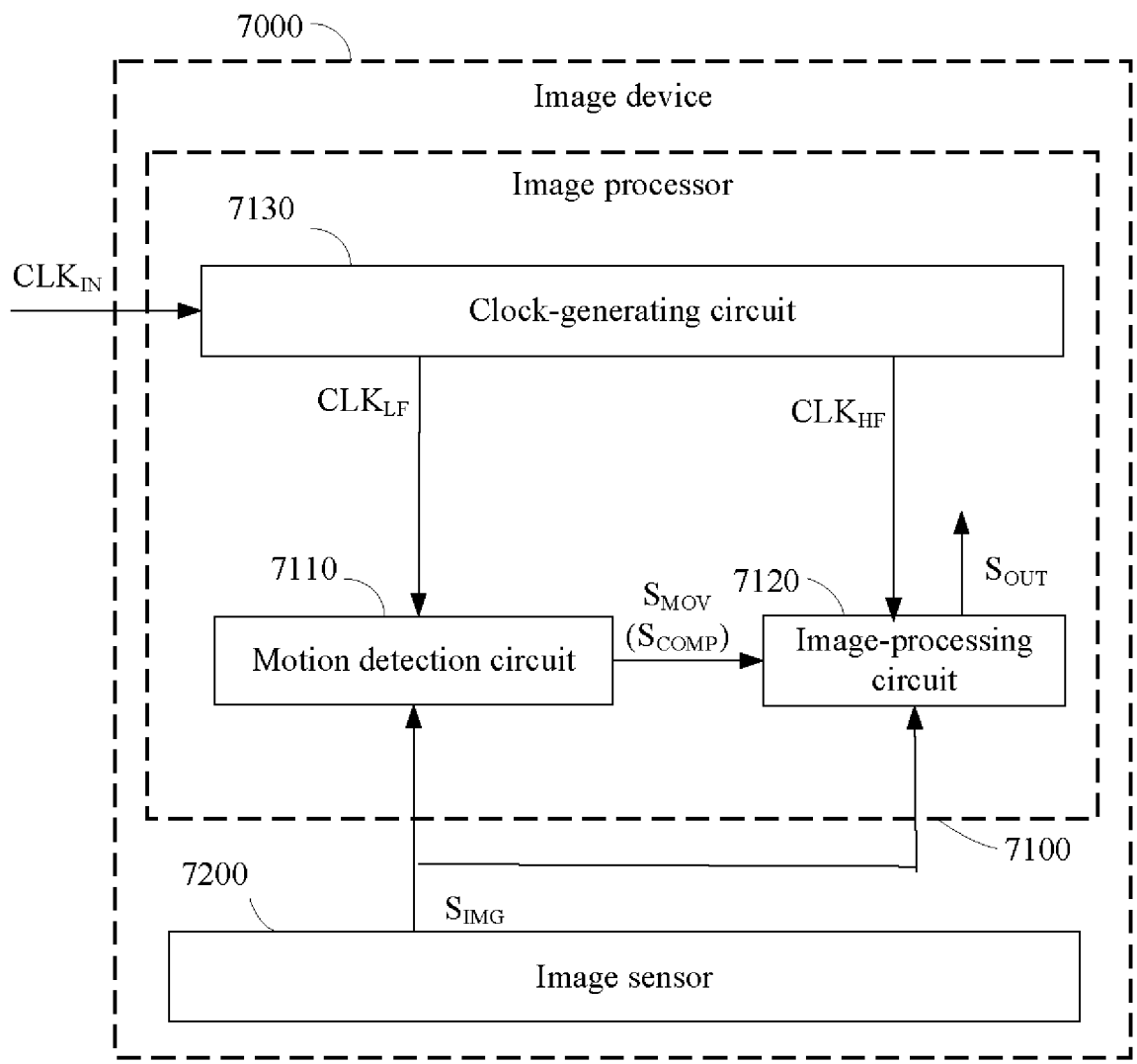
FIG. 7 is a schematic diagram illustrating an image device according to another embodiment of the image device of the present disclosure.

Please refer to FIG. 7. FIG. 7 is a schematic diagram illustrating an image device 7000 according to another embodiment of the image device of the present disclosure. The image device 7000 includes an image signal processor 7100 and an image sensor 7200. The structure and the operational principle of the image sensor 7200 are similar to those of the image sensor 2200, and thus not be repeated again for brevity. The image signal processor 7100 includes a motion detection circuit 7110, an image-signal-processing circuit 7120, and a clock-generating circuit 7130. The structures and operational principles of the motion detection circuit 7110 and the image-signal-processing circuit 7120 are respectively similar to those of the motion detection circuit 5110 and image-signal-processing circuit 2120, and thus not be repeated again for brevity. The clock-generating circuit 7130 is coupled to the motion detection circuit 7110 and the image-signal-processing circuit 7120. The clock-generating circuit 7130 receives input clock $CLK_{IN}$, to output a high-frequency clock $CLK_H$ and a low-frequency clock $CLK_L$. The frequency of the clock $CLK_L$ is lower than that of the clock $CLK_H$. When the image-signal-processing circuit 7120 is in active state, the clock-generating circuit 7130 outputs the high-frequency clock $CLK_H$ for image-signal-processing circuit 7120 to operate. When the image-signal-processing circuit 7120 is in power-off/power-saving state, the clock-generating circuit 7130 stops outputting the high-frequency clock $CLK_H$. The states of the motion detection circuit 7110 include active state and power-off/power-saving state. When the motion detection circuit 7110 is in active state, the clock-generating circuit 7130 outputs the low-frequency clock $CLK_L$ for the motion detection circuit 7110 to detect moving objects and to generate the motion detection result $S_{MOV}$ accordingly. When the motion detection circuit 7110 is in power-off/power-saving state, the clock-generating circuit 7130 stops outputting the low-frequency clock $CLK_L$. In this way, when the motion detection result $S_{MOV}$ generated by the motion detection circuit 7110 represents "motion", the clock-generating circuit 7130 outputs the high-frequency clock $CLK_H$ for the image-signal-processing circuit 7120 to operate. When the motion detection result $S_{MOV}$ generated by the motion detection circuit 7110 represents "motionless", the clock-generating circuit 7130 stops outputting high-frequency clock $CLK_H$, saving more power consumption of the image device 7000.

Figure 8:
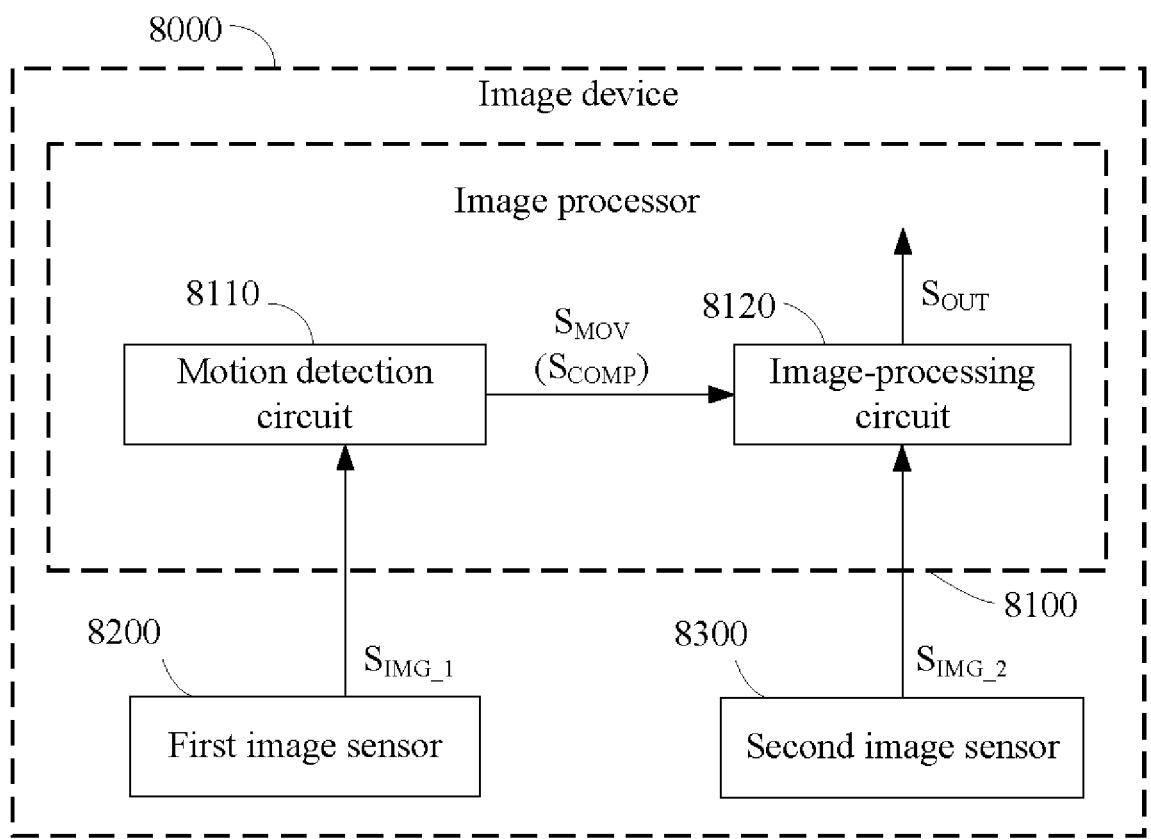
FIG. 8 is a schematic diagram illustrating an image device according to another embodiment of the present disclosure.

Please refer to FIG. 8. FIG. 8 is a schematic diagram illustrating an image device 8000 according to another embodiment of the present disclosure. The image device 8000 includes an image signal processor 8100, a first image sensor 8200, and a second image sensor 8300. The first image sensor 8200 receives light to output an image signal $S_{IMG\_1}$. The second image sensor 8300 receives light to output an image signal $S_{IMG\_2}$. The structure and the operational principle of the image signal processor 8100 are similar to those of the image signal processor 2100. The difference between the image signal processors 8100 and 2100 is that in the image signal processor 8100, the motion detection circuit 8110 detects moving objects to generate the motion detection result $S_{MOV}$ according to the image signal $S_{IMG\_1}$ of the first image sensor 8200, and the image-signal-processing circuit 8120 generate output signal $S_{OUT}$ according to the image signal $S_{IMG\_2}$ of the second image sensor 8300. In the image device 8000, the resolution of the first image sensor 8200 is less than that of the second image sensor 8300. In this way, the image device 8000 detects moving objects with low power consumption, and generates the output signal $S_{OUT}$ according to the high resolution image.

Figure 9:
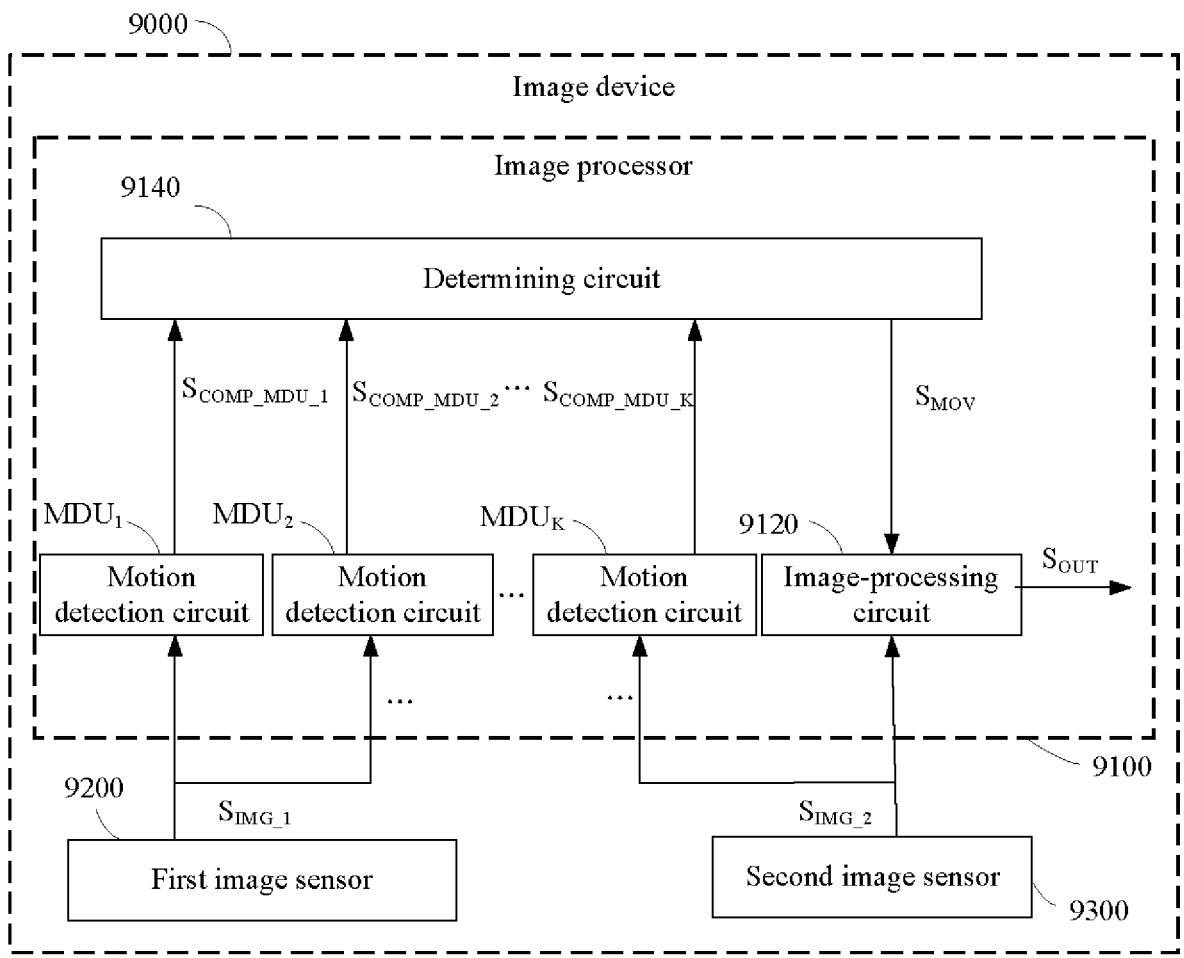
FIG. 9 is a schematic diagram illustrating an image device according to another embodiment of the present disclosure.

Please refer to FIG. 9. FIG. 9 is a schematic diagram illustrating an image device 9000 according to another embodiment of the present disclosure. The image device 9000 includes an image signal processor 9100, a first image sensor 9200, and a second image sensor 9300. The first image sensor 9200 receives light to output image signal $S_{IMG\_1}$. The second image sensor 9300 receives light to output image signal $S_{IMG\_2}$. The image signal processor 9100 includes motion detection circuits $MDU_1$~$MDU_K$, an image-signal-processing circuit 9120, and a determining circuit 9140, wherein K represents an integer. The image-signal-processing circuit 9120 generates output signal $S_{OUT}$ according to the image signal $S_{IMG\_2}$ of the second image sensor 9300. The structures and the operational principles of the motion detection circuits $MDU_1$~$MDU_K$ are similar to that of the motion detection circuit 5110. The motion detection circuits $MDU_1$~$MDU_K$ respectively generate comparing signals $S_{COMP\_MDU\_1}$~$S_{COMP\_MDU\_K}$ and output the comparing signals $S_{COMP\_MDU\_1}$~$S_{COMP\_MDU\_K}$ to the determining circuit 9140. Among the motion detection circuits $MDU_1$~$MDU_K$, some motion detection circuits, such as $MDU_1$ and $MDU_2$, are coupled to the first image sensor 9200 and generate the comparing signals according the image signal $S_{IMG\_1}$, and the other motion detection circuits, such as $MDU_K$, are coupled to the second image sensor 9300 and generate the comparing signals according the image signal $S_{IMG\_2}$. In addition, each motion detection circuit $MDU_1$~$MDU_K$ generates representative data in different way. For instance, the sub-region representative data of motion detection circuit $MDU_1$ is the average value of the data of the plurality of pixels in corresponding sub-region image, and the sub-region representative data of motion detection circuit $MDU_2$ is the histogram of the data of the plurality of pixels in corresponding sub-region image. The determining circuit 9140 takes the comparing signals $S_{COMP\_MDU\_1} \sim S_{COMP\_MDU\_K}$ into consideration, and generates the motion detection result $S_{MOV}$ accordingly.

Figure 10:
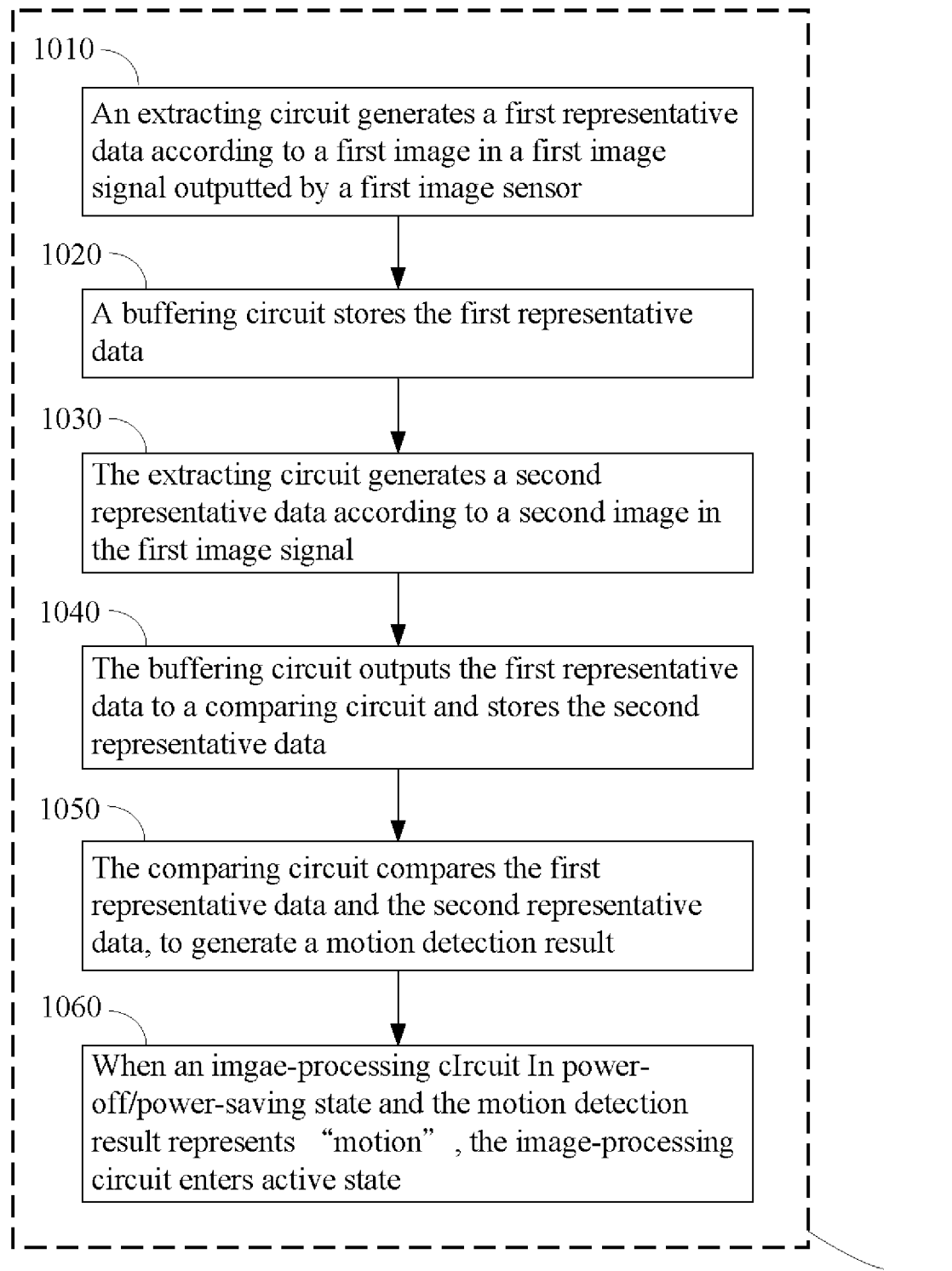
FIG. 10 is a flowchart illustrating a motion detection method according to an embodiment of the present disclosure.

Please refer to FIG. 10. FIG. 10 is a flowchart illustrating a motion detection method 1000 according to an embodiment of the present disclosure. The motion detection method 1000 can be utilized in the motion detection circuit, the image signal processor, or the image device. Take the motion detection circuit 2110, the image signal processor 2100, and the image device 2000 as example. The steps of the method 1000 are illustrated as below:

Step 1010: the extracting circuit 2111 generates the representative data $DATA_{(J-1)}$ according to the image $VF_{(J-1)}$ in the image signal $S_{IMG}$ outputted by the image sensor 2200;

Step 1020: the buffering circuit 2112 stores the representative data $DATA_{(J-1)}$;

Step 1030: the extracting circuit 2111 generates the representative data $DATA_J$ according the image $VF_J$ in the image signal $S_{IMG}$;

Step 1040: the buffering circuit 2112 stores the representative data $DATA_J$, and outputs the representative data $DATA_{(J-1)}$ to the comparing circuit 2113;

Step 1050: the comparing circuit 2113 compares the representative data $DATA_{(J-1)}$ and $DATA_J$, to generate a motion detection result $S_{MOV}$;

Step 1060: when the image-signal-processing circuit 2120 is in power-off/power-saving state and the motion detection result $S_{MOV}$ represents "motion", the image-signal-processing circuit 2120 enters active state, and generates output signal $S_{OUT}$ according to the image signal $S_{IMG}$ outputted by the image sensor 2200.

In steps 1010, the extracting circuit 2111 generates the representative data $DATA_{(J-1)}$ according the image $VF_{(J-1)}$ in the image signal $S_{IMG}$ outputted by the image sensor 2200. Furthermore, the extracting circuit 2111 generates the sub-region representative data $DATA_{(J-1)\_11} \sim DATA_{(J-1)\_MN}$ according to the sub-region images $VF_{(J-1)\_11} \sim VF_{(J-1)\_MN}$ in the image $VF_{(J-1)}$, wherein the sub-region representative data $DATA_{(J-1)\_11} \sim DATA_{(J-1)\_MN}$ are average values, histogram, or maximum and minimum values of the data of a plurality of pixels in the corresponding sub-region images $VF_{(J-1)\_11} \sim VF_{(J-1)\_MN}$. Take the sub-region image $VF_{(J-1)\_XY}$ corresponding to the sub-sensing region $R_{XY}$ in the image $VF_{(J-1)}$ of FIG. 3 as example. When the extracting circuit 2111 receives the data of a pixel in sub-region image $VF_{(J-1)\_XY}$, the extracting circuit 2111 updates the in-progress sub-region representative data $DATA_{(J-1)\_XY\_TEMP}$, according to the in-progress sub-region representative data $DATA_{(J-1)\_XY\_TEMP}$ previously stored in the temporary storage unit $TB_Y$ and the data of the received pixel, and stores the updated in-progress sub-region representative data $DATA_{(J-1)\_XY\_TEMP}$ in the temporary storage unit $TB_Y$. When the image sensor 2200 is finished with transmitting the data of the pixels in sub-region image $VF_{(J-1)\_XY}$, the extracting circuit 2111 generates the sub-region representative data $DATA_{(J-1)\_XY}$. More particularly, the extracting circuit 2111 outputs the in-progress sub-region representative data $DATA_{(J-1)\_XY\_TEMP}$, as the sub-region representative data $DATA_{(J-1)\_XY}$, to the buffering circuit 2112 and the comparing circuit 2113.

In the step 1020, the buffering circuit 2112 stores the sub-region representative data $DATA_{(J-1)\_XY}$ into the corresponding buffering unit $BB_{XY}$.

In the step 1030, the extracting circuit 2111 generates the sub-region representative data $DATA_{J\_11} \sim DATA_{J\_MN}$ according to the sub-region images $VF_{J\_11} \sim VF_{J\_MN}$ of the image $VF_J$. Take the sub-region image $VF_{J\_XY}$ corresponding to the sub-sensing region $R_{XY}$ in the image $VF_J$ as an example. Every time when the extracting circuit 2111 receives data of a pixel in sub-region image $VF_{J\_XY}$, the extracting circuit 2111 updates the in-progress sub-region representative data $DATA_{J\_XY\_TEMP}$, according to the in-progress sub-region representative data $DATA_{J\_11\_TEMP}$ previously stored in the temporary storage unit $TB_Y$ and the data of the received pixel, and the extracting circuits 2111 stores the updated in-progress sub-region representative data $DATA_{J\_11\_TEMP}$ into the temporary storage unit $TB_Y$. When the image sensor 2200 is finished with transmitting the data of the pixels in sub-region image $VF_{J\_XY}$, the extracting circuit 2111 outputs the in-progress representative data $DATA_{J\_XY\_TEMP}$ stored in the temporary storage unit $TB_Y$ as the sub-region representative data $DATA_{J\_XY}$ to the buffering circuit 2112 and the comparing circuit 2113.

In the step 1040, when the extracting circuit 2111 generates the sub-region representative data $DATA_{J\_XY}$, the buffering circuit 2112 outputs the sub-region representative data $DATA_{(J-1)\_XY}$ to the comparing circuit 2113, and stores the sub-region representative data $DATA_{J\_XY}$ to the buffering unit $BB_{XY}$.

In the step 1050, the comparing circuit 2113 compares the sub-region representative data $DATA_{J\_XY}$ generated by the extracting circuit 2111 and the sub-region representative data $DATA_{(J-1)\_XY}$ outputted by the buffering circuit 2112, to generate the comparing signal $S_{COMP}$ as the motion detection result $S_{MOV}$. When the difference between the sub-region representative data $DATA_{J\_XY}$ and $DATA_{(J-1)\_XY}$ is large, the comparing circuit 2113 determines that there is moving object in the field of view of the sub-sensing region $R_{XY}$. Therefore, the comparing circuit 2113 generates the comparing signal $S_{COMP}$ as the motion detection result $S_{MOV}$ representing "motion". When the difference between the sub-region representative data $DATA_{J\_XY}$ and $DATA_{(J-1)\_XY}$ is little, the comparing circuit 2113 determines that there is no moving object in the field of view of the sub-sensing region $R_{XY}$. Hence, the comparing circuit 2113 generates the comparing signal $S_{COMP}$ as the motion detection result $S_{MOV}$ representing "motionless".

In the step 1060, when the image-signal-processing circuit 2120 is in power-off/power-saving state and the motion detection result $S_{MOV}$ represents "motion", the image-signal-processing circuit 2120 enters active state and generates output signal $S_{OUT}$ according to the image signal $S_{IMG}$ outputted by the image sensor 2200. The output signal $S_{OUT}$ can be video with H.264/H.265/MJPEG compression format, or photo with JPEG format, or the image analysis data by analyzing the image data in image signal $S_{IMG}$. In addition, in the step 1060, the image-signal-processing circuit also can generate output signal $S_{OUT}$ according to the image signal $S_{IMG\_2}$ outputted by the second image sensor 8300 in the way similar to the image-signal-processing circuit 8120 in FIG. 8.

According to another embodiment of the present disclosure, the motion detection method can operate once every H images, wherein 1≤H. Take the operational method of motion detection circuit 5110 in FIG. 5 as an example. In the step 1010, the extracting circuit 5111 generates the representative data $DATA_{(J-H)}$ according to the image $VF_{(J-H)}$ in the image signal $S_{IMG}$ outputted by the image sensor 2200. In the step 1020, the buffering circuit 5112 stores the representative data $DATA_{(J-H)}$. In the step 1030, the extracting circuit 5111 generates the representative data $DATA_J$ according to the image $VF_J$ in the image signal $S_{IMG}$ outputted by the image sensor 2200. In the step 1040, the buffering circuit 5112 stores the representative data $DATA_J$ and outputs the representative data $DATA_{(J-H)}$ to the comparing circuit 5113. In the step 1050, the comparing circuit 5113 compares the representative data $DATA_{(J-H)}$ and $DATA_J$, to generate the comparing signal $S_{COMP}$ as the motion detection result $S_{MOV}$.

In addition, the step 1050 can be similar to the operation method of the comparing circuit 6113 of FIG. 6. That is, the comparing unit 61131 of the comparing circuit 6113 compares the representative data from the extracting circuit 5111 and the representative data from the buffering circuit 5112 of plural periods, so as to respectively generate the comparing signals of the plural periods. The temporal filter 61132 filters the comparing signals of the plural periods, to generate the motion detection result $S_{MOV}$.

In conclusion, the present invention provides a motion detection method which can be utilized in motion detection circuits, image signal processors, or image devices. In the motion detection method of the present invention, an extracting circuit generates representative data corresponding to images in an image signal outputted by an image sensor. When the extracting circuit generates the representative data corresponding to the current image, a buffering circuit outputs the representative data corresponding to the previous image to a comparing circuit, and stores the representative data corresponding to the current image. The comparing circuit generates a comparing signal as a motion detection result, according to the difference between the representative data corresponding to the previous image and the current image. When an image-signal-processing circuit is in power-off/power-saving state and the motion detection result represents "motion", the image-signal-processing circuit enters active state to generate an output signal based on the image signal from the image sensor. By means of the motion detection method, in an imaging device, the image-signal-processing circuit of the image signal processor still can switch between active state and power-off/power-saving state even when there is no additional infrared sensor. Hence, the cost and the size of the imaging device are reduced. In addition, when detecting there is moving object and the image-signal-processing circuit is triggered to enter active state, the video or photo in the output signal includes the moving objects, or the image analysis data of the output signal includes the information of moving objects, providing more convenience to the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection circuit, comprising:
an extracting circuit, coupled to an image sensor, the image sensor receiving light to output an image signal, the extracting circuit generating a first representative data according to a first image in the image signal, and generating a second representative data according to a second image in the image signal;
a buffering circuit, coupled to the extracting circuit; and
a comparing circuit, coupled to the extracting circuit and the buffering circuit, the comparing circuit generating a comparing signal as a motion detection result;
wherein when the extracting circuit generates the first representative data, the buffering circuit stores the first representative data;
wherein when the extracting circuit generates the second representative data, the buffering circuits stores the second representative data and outputs the first representative data to the comparing circuit, and the comparing circuit generates the comparing signal as the motion detection result according to the first and the second representative data;
wherein when the motion detection circuit is in an active state, a clock-generating circuit outputs a low-frequency clock to the motion detection circuit;
wherein when the motion detection circuit is in a power-off state, the clock-generating circuit stops outputting the low-frequency clock.

2. The motion detection circuit of claim 1, wherein the motion detection circuit is coupled to an image-signal-processing circuit;
wherein when the image-signal-processing circuit is in the power-off/a power-saving state and the motion detection result represents "motion", the image-signal-processing circuit enters the active state;
wherein when the image-signal-processing circuit is in the active state, the image-signal-processing circuit generates an output signal according to the image signal.

3. The motion detection circuit of claim 1, wherein the first image comprises a first sub-region image and a second sub-region image;
wherein the extracting circuit generates a first sub-region representative data of the first representative data according to the first sub-region image, and generates a second sub-region representative data of the first representative data according to the second sub-region image.

4. The motion detection circuit of claim 3, wherein the first sub-region representative data is an average value, a histogram, or maximum and minimum values of data of pixels which include at least a plurality of pixels in the first sub-region image;
wherein the second sub-region representative data is an average value, a histogram, or maximum and minimum values of data of pixels which include at least a plurality of pixels in the second sub-region image.

5. The motion detection circuit of claim 1, wherein the extracting circuit generates a third representative data according to a third image in the image signal;
wherein when the extracting circuit generates the third representative data, the buffering circuit stores the third representative data and outputs the second representative data to the comparing circuit, and the comparing circuit generates the motion detection result according to the first, the second, and the third representative data.

6. The motion detection circuit of claim 5, wherein the comparing circuit comprises:
a comparing unit, comparing the first and the second representative data during a first period, to generate the comparing signal corresponding to the first period, and comparing the second and the third representative data during a second period, to generate the comparing signal corresponding to the second period; and
a temporal filter, filtering the comparing signal corresponding to the first period and the comparing signal corresponding to the second period, to generate the motion detection result.

7. An image signal processor, comprising:
a clock-generating circuit, utilized for outputting a clock;
a motion detection circuit, comprising:
an extracting circuit, coupled to an image sensor, the image sensor receiving light to output an image signal, the extracting circuit generating a first representative data according to a first image in the image signal and generating a second representative data according to a second image in the image signal;

a buffering circuit, coupled to the extracting circuit; and a comparing circuit, coupled to the extracting circuit and the buffering circuit, the comparing circuit generating a comparing signal as a motion detection result;

wherein when the extracting circuit generates the first representative data, the buffering circuit stores the first representative data;

wherein when extracting circuit generates the second representative data, the buffering circuits stores the second representative data and outputs the first representative data to the comparing circuit, and the comparing circuit compares the first and the second representative data to generate the comparing signal as the motion detection result; and an image-signal-processing circuit, utilized for generating an output signal;

wherein when the image-signal-processing circuit is in a power-off/power-saving state and the motion detection result represents "motion", the image-signal-processing circuit enters an active state;

wherein when the image-signal-processing circuit is in the active state, the image-signal-processing circuit generates the output signal according to the image signal;

wherein when the image-signal-processing circuit is in the active state, the clock-generating circuit outputs a high-frequency clock to the image-signal-processing circuit;

wherein when the image-signal-processing circuit is in the power-off/power-saving state, the clock-generating circuit stops outputting the high-frequency clock;

wherein when the motion detection circuit is in the active state, the clock-generating circuit outputs a low-frequency clock to the motion detection circuit;

wherein when the motion detection circuit is in the power-off state, the clock-generating circuit stops outputting the low-frequency clock.

8. The image signal processor of claim 7, wherein the first image comprises a first sub-region image and a second sub-region image;

wherein the extracting circuit generates a first sub-region representative data of the first representative data according to the first sub-region image, and generates a second sub-region representative data of the first representative data according to the second sub-region image.

9. The image signal processor of claim 8, wherein the first sub-region representative data is an average value, a histogram, or maximum and minimum values of data of pixels which include at least a plurality of pixels in the first sub-region image;

wherein the second sub-region representative data is an average value, a histogram, or maximum and minimum values of data of pixels which include at least a plurality of pixels in the second sub-region image.

10. An image device, comprising:

a first image sensor, receiving light to generate a first image signal; and an image signal processor, comprising:

a clock-generating circuit, utilized for outputting a clock;

a first motion detection circuit, comprising:

a first extracting circuit, coupled to the first image sensor, generating a first representative data according to a first image in the first image signal and generating a second representative data according to a second image in the first image signal;

a first buffering circuit, coupled to the first extracting circuit; and a first comparing circuit, coupled to the first extracting circuit and the first buffering circuit, the first comparing circuit generating a first comparing signal as a motion detection result;

wherein when the first motion detection circuit is in a power-off state, the clock-generating circuit stops outputting the low-frequency clock;

wherein when the first extracting circuit generates the first representative data, the first buffering circuit stores the first representative data;

wherein when the first extracting circuit generates the second representative data, the first buffering circuits stores the second representative data and outputs the first representative data to the first comparing circuit, and the first comparing circuit compares the first and the second representative data to generate the first comparing signal as the motion detection result; and an image-signal-processing circuit, generating an output signal;

wherein when the image-signal-processing circuit is in the power-off/a power-saving state and the motion detection result represents "motion", the image-signal-processing circuit enters an active state;

wherein when the image-signal-processing circuit is in the active state, the image-signal-processing circuit generates the output signal;

wherein when the image-signal-processing circuit is in the active state, the clock-generating circuit outputs a high-frequency clock to the image-signal-processing circuit;

wherein when the image-signal-processing circuit is in the power-off/power-saving state, the clock-generating circuit stops outputting the high-frequency clock;

wherein when the first motion detection circuit is in the active state, the clock-generating circuit outputs a low-frequency clock to the first motion detection circuit;

wherein when the first motion detection circuit is in the power-off state, the clock-generating circuit stops outputting the low-frequency clock.

11. The image device of claim 10, further comprising:

a second image sensor, receiving light to generate a second image signal;

wherein the image-signal-processing circuit generates the output signal according to the second image signal.

12. The image device of claim 10, wherein the image-signal-processing circuit generates the output signal according to the first image signal.

13. The image device of claim 10, wherein the first image comprises a first sub-region image and a second sub-region image;

wherein the first extracting circuit generates a first sub-region representative data of the first representative data according to the first sub-region image, and generates a second sub-region representative data of the first representative data according to the second sub-region image.

14. The image device of claim 13, wherein the first sub-region representative data is an average value, a histogram, or maximum and minimum values of data of pixels which include at least a plurality of pixels in the first sub-region image;

wherein the second sub-region representative data is an average value, a histogram, or maximum and minimum values of data of pixels which include at least a plurality of pixels in the second sub-region image.

15. A motion detection method, comprising:
an extracting circuit generating a first representative data according to a first image in a first image signal outputted by a first image sensor;
a buffering circuit storing the first representative data;
the extracting circuit generating a second representative data according to a second image in the first image signal;
the buffering circuit storing the second representative data and outputting the first representative data to a comparing circuit; and
the comparing circuit comparing the first and the second representative data to generate a motion detection result;
wherein in an active state, a clock-generating circuit outputs a low-frequency clock to the motion detection circuit;
wherein in a power-off state, the clock-generating circuit stops outputting the low-frequency clock.

16. The motion detection method of claim 15, further comprising:
when an image-signal-processing circuit is in the power-off/a power-saving state and the motion detection result represents "motion", the image-signal-processing circuit enters the active state;
wherein when the image-signal-processing circuit is in the active state, the image-signal-processing circuit generates an output signal according to the first image signal.

17. The motion detection method of claim 15, further comprising:
when an image-signal-processing circuit is in the power-off/a power-saving state and the motion detection result represents "motion", the image-signal-processing circuit enters the active state;
wherein when the image-signal-processing circuit is in the active state, the image-signal-processing circuit generates an output signal according to a second image signal outputted by a second image sensor.

18. The motion detection method of claim 15, wherein the extracting circuit generating the first representative data according to the first image in the first image signal outputted by the first image sensor comprises:

the extracting circuit generating a first sub-region representative data of the first representative data according to the first sub-region image or the first image; and
the extracting circuit generating a second sub-region representative data of the first representative data according to the second sub-region image of the first image.

19. The motion detection method of claim 18, wherein the first sub-region representative data is an average value, a histogram, or maximum and minimum values of data of pixels which include at least a plurality of pixels in the first sub-region image;
wherein the second sub-region representative data is an average value, a histogram, or maximum and minimum values of data of pixels which include at least a plurality of pixels in the second sub-region image.

20. The motion detection method of claim 15, further comprises:
the extracting circuit generating a third representative data according to a third image in the first image signal;
when the extracting circuit generates the third representative data, the buffering circuit storing the third representative data and outputting the second representative data to the comparing circuit; and
the comparing circuit generating the motion detection result according to the first, the second, and the third representative data.

21. The motion detection method of claim 20, wherein the comparing circuit generating the motion detection result according to the first, the second, and the third representative data comprises:
a comparing unit of the comparing circuit comparing the first and the second representative data during a first period, to generate the comparing signal corresponding to the first period;
the comparing unit comparing the second and the third representative data during a second period, to generate the comparing signal corresponding to the second period; and
a temporal filter of the comparing circuit filtering the comparing signals corresponding to the first and the second periods, to generate the motion detection result.

* * * * *